United States Patent [19]

Blickstein

[11] Patent Number: 4,490,772
[45] Date of Patent: Dec. 25, 1984

[54] VOLTAGE AND MECHANICALLY VARIABLE TRIMMER CAPACITOR

[76] Inventor: Martin J. Blickstein, 927 Pine Oak Trail, Austell, Ga. 30001

[21] Appl. No.: 503,875

[22] Filed: Jun. 13, 1983

[51] Int. Cl.³ .......................... H01G 7/00; H01G 5/06
[52] U.S. Cl. ....................................... 361/281; 361/293
[58] Field of Search ............... 361/277, 278, 281, 287, 361/292, 293, 298

[56] References Cited

U.S. PATENT DOCUMENTS

| | | | |
|---|---|---|---|
| 3,170,099 | 2/1965 | Sperry et al. | 361/293 |
| 3,656,033 | 4/1972 | Nikles et al. | 361/293 |
| 4,056,842 | 11/1977 | Sienicki et al. | 361/278 X |

FOREIGN PATENT DOCUMENTS 465634  5/1937  United Kingdom ................ 361/298

OTHER PUBLICATIONS

Electronic Industries, Jul. 1958, A Voltage Variable Capacitor, pp. 77 to 80.

*Primary Examiner*—Donald A. Griffin
*Attorney, Agent, or Firm*—Louis T. Isaf

[57] ABSTRACT

A variable capacitor which is both mechanically and electrically tunable includes a mechanically operable rotor/stator capacitor combination; and either the rotor or stator portion of the capacitor comprises a piezoelectric assembly which becomes dished in response to a voltage applied thereto, resulting in an air gap being created between the rotor and stator elements, thus effecting a variable capacitance as a result of the voltage application.

12 Claims, 14 Drawing Figures

VOLTAGE AND MECHANICALLY VARIABLE TRIMMER CAPACITOR

TECHNICAL FIELD

This invention relates to capacitors, and particularly discloses a single capacitor element which may be varied by mechanical repositioning of the capacitor plates and tuned electrically to vary the capacitance over relatively wide range. It is particularly suited as a substitute for varactors.

BACKGROUND OF THE INVENTION

The increased use of electromagnetic waves for communication has spawned a crowding of the electromagnetic spectrum, and has led to a pressing need for the design of reliable high frequency electronic components from which equipment for utilizing the higher frequencies of the RF spectrum may be constructed. A common feature of many electronic communication devices is the need for components which exhibit a variable impedance. Devices as simple as potentiometers used in volume controls, and multiplate ganged variable capacitors, have long been used for effecting mechanically driven changes in impedance. The multiplate ganged capacitor was for many years the standard variable reactive impedance used in tuning radios.

More recent developments have led to a large market for devices exhibiting a reactive impedance which may be electronically changed. While these devices have a multiplicity of uses, one of their most common uses is that of a voltage variable reactance as a frequency determining element in an oscillator circuit. The result is, of course, a variation in the output frequency of the oscillator.

For many years such an arrangement has been a staple component of television receivers. The most widely used embodiment of electronically variable reactive impedances is a device known as the varactor diode. These have been widely used in tuning circuits and automatic frequency control circuits since the 1960's. More recently, as phase lock loop frequency synthesis has become more popular, varactor diodes are used as components of the voltage controlled oscillators in phase lock loop tuning circuits.

While varactors have been widely used, and continue to enjoy a great popularity, there are a number of drawbacks to the use of varactors. Some of the constraints of semiconductor physics irrevocably lead to some undesirable properties in varactors. At least one result of these constraints is that varactors are characterized by relatively low quality factors (Q). As the design of electronic circuitry requiring tuned reactive components, and a particularly tuned capacitor, extends into higher frequency ranges, the problems associated with the relatively low Q of varactors become exacerbated.

While varactors are extremely useful devices and will maintain an established place in the electronic arts in the near term, they exhibit well known deficiencies as a result of the physics of their fabrication. As the need for higher and higher frequency communication circuits increases, it will be appreciated that more and more applications for electronically variable reactances present themselves for which varactor diodes and other prior art devices are unsuited.

Thus, there is a strong need in the current state of the art for a device which can inexpensively replace varactor diodes, in the common combination of fixed or mechanically changeable capacitor in parallel with a varactor, and which will exhibit relatively high Qs at frequencies outside the practical operating range of inexpensive varactors.

In the past, a number of variable capacitance arrangements have been proposed using piezoelectric elements to vary the spacing between capacitor plates. For example, U.S. Pat. Nos. 2,368,643 and 3,646,413 show variable capacitors which may be varied by a voltage applied to produce an electric field through a piezoelectric element. The piezoelectric element is mounted on a cantilever to enhance the mechanical movement and thus enhance the change in capacitance. These arrangements appear to be susceptible to "creep" and a significant degree of thermal instability. The disclosure of U.S. Pat. No. 3,646,413 shows complex geometries, and an electronic feedback circuit to compensate for the mechanical instabilities of the cantilevered piezoelectric arrangement. This tends to increase the cost of such a device.

U.S. Pat. No. 3,949,246 shows a voltage variable capacitor, each plate of which consists of a metalized deposit on a piezoelectric bimorph. A control voltage to vary the capacitance is provided to cause the bimorphs to flex, thus bringing the plates closer together, increasing the capacitance of the arrangement. The structure of the device disclosed in U.S. Pat. No. 3,949,246 inherently provides a large contact area between the two bimorph elements carrying the capacitor plates. As is known to those skilled in the art, the interface between the bimorph elements acts as a shunt across the capacitor plates. It appears to the inventor of the present invention that this device would also suffer from unacceptably low quality factors as the frequency applied to the capacitor terminals exceeds ten megahertz.

In practical applications, prior art devices, both varactors and prior art piezoelectric capacitors usually require either a fixed or mechanically adjustable capacitor to be placed in parallel with the variable element to set the midpoint of the desired tuning range. This increases the number of parts necessary to construct a circuit making practical use of such devices. Additionally, varactor diodes, being two terminal devices, of necessity have both the control voltage and the alternating voltage of interest applied between the same terminals. Since in most applications of varactors, it is desired to vary the control voltage without causing additional distortion to the alternating signal of interest, circuits using varactors normally require that the magnitude of the alternating voltage be significantly smaller than that of the control voltage lest the capacitance of the device begin changing at a frequency corresponding to the alternating frequency of interest.

Additionally, any significant amplitude modulation of the signal controlled by the varactor will lead to changes in capacitance which can thus impose an unwanted modulation of the frequency upon the signal.

SUMMARY OF THE PRESENT INVENTION

Most simply described, the present invention is a variable capacitor which has both a wide mechanical tuning range which may be adjusted in a manner similar to that of conventional "trimmer" capacitors, and is also voltage variable.

In its preferred forms, the present invention includes a stator and rotor structure similar to that of conventional trimmers which also includes a piezoelectric element which responds to an applied voltage to electronically vary the capacitance of the device.

Thus, the present invention provides a single component which can readily replace the parallel combination of a varactor diode and a mechanically adjustable trimmer capacitor at a competitive cost.

Additionally, the present invention can be used to replace parallel combinations of mechanical trimmer capacitors and previously known piezoelectric variable capacitors at a cost savings.

As will become apparent from the detailed description to follow, the present invention provides a unitary capacitive device which is both mechanically adjustable as a trimmer capacitor and is voltage tunable, and has several of the following advantages over the prior art. Embodiments of the present invention may be readily constructed for which the entire tuning range of the electrically variable capacitance may be achieved over an applied voltage range of fifty volts or less. The invention overcomes the problem of low quality factor at high frequencies exhibited by varactor diodes and exhibits acceptable quality factors at frequencies decades above frequencies at which the Q of most varactor diodes starts to deteriorate rapidly.

In addition to the above advantages, the present invention provides a piezoelectric structure for the voltage controlled variation of the capacitance which is more stable than that of prior art piezoelectric variable capacitors, does not exhibit the problems of creep associated with the prior art, and which may be selectively fabricated to provide either positive or negative temperature coefficients.

Additionally, the capacitance versus applied control voltage characteristics of certain embodiments of the present invention includes a wider approximately linear range of variable capacitance than that of varactor diodes.

In the preferred form of the present invention, the capacitor plates are of semicircular geometry, one fixed to a stator and a second fixed to a rotor. The stator, or first plate of the capacitor, is connected to one side of a dielectric washer element. The piezoelectric element includes a pair of electrodes, one of which acts as the second "plate" of the capacitor. The resultant assembly is one which provides three external terminals to the user, a common terminal being the capacitor "plate" connected to the rotor which is also one of the input terminals for the control voltage. The second electrode of the piezoelectric element accepts the control voltage and the third terminal is connected to the stator plate of the capacitor. Thus, the applied voltage for electrically varying the capacitance of the device may be applied independently of the signal of interest across the capacitor.

Additionally, the structure of preferred forms of the present invention provides a significant improvement over prior art, such as that shown in U.S. Pat. No. 3,949,246 in that the mechanical movements provided by the piezoelectric bimorph vary the effective spacing between plates of a capacitor whose dielectric element has a permittivity much greater than air.

Therefore, it is an object of the present invention to provide a unitary three terminal capacitor structure which is both mechanically variable in a manner similar to a convential trimmer capacitor and which is also voltage variable.

It is a further object of the present invention to provide a voltage variable capacitor for use at ultrahigh frequency extending beyond one gigahertz which will exhibit quality factors greater than fifty at such frequencies, and quality factors which are far superior to those of varactor diodes at such frequencies.

Other objects, features and advantages of the present invention will become apparent upon reading and understanding this specification when taken in conjunction with the accompaying drawings.

DETAILED DESCRIPTION OF PREFERRED EMBODIMENTS

Figure 1:
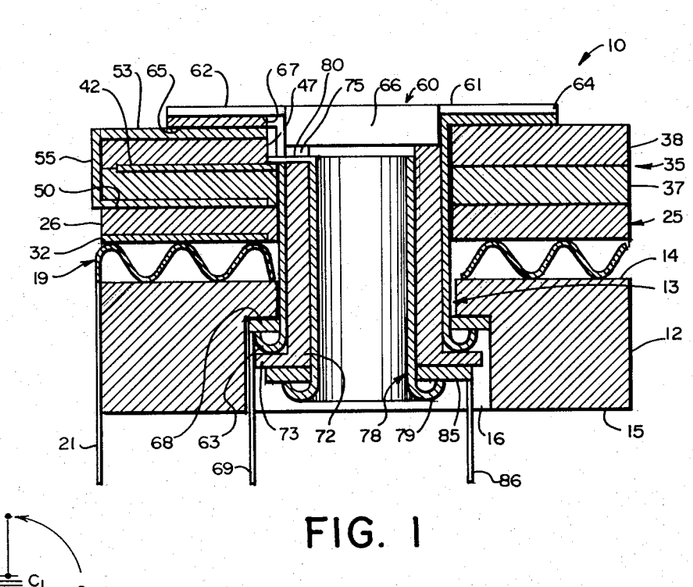
FIG. 1 is a cross-sectional, side view of the Voltage and mechanically variable trimmer capacitor in accordance with the present invention.
Figures 2, 2A:
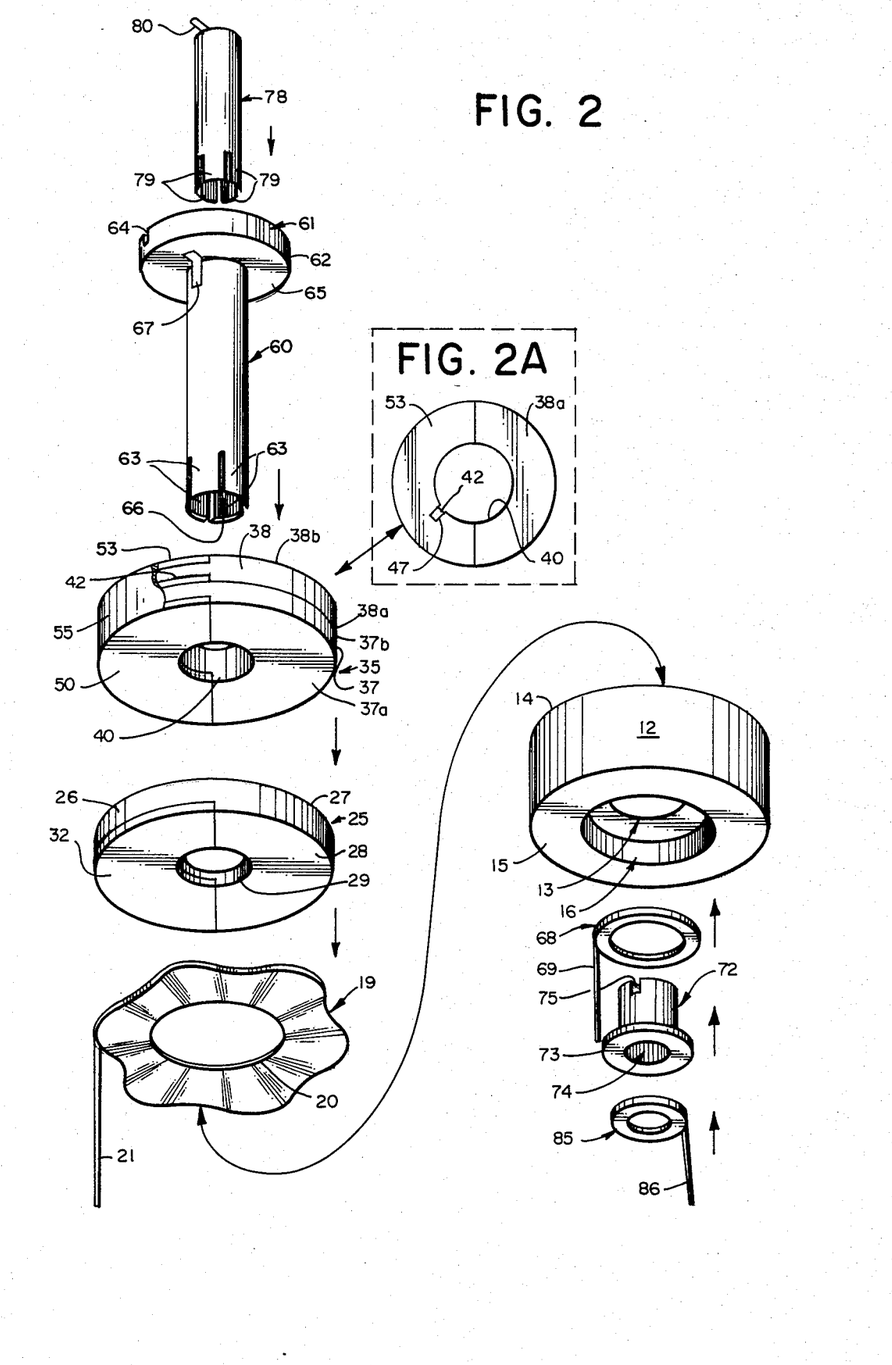
FIG. 2 is an exploded view of the invented capacitor of FIG. 1.
FIG. 2A is an isolated, top view of the Rotor/piezo assembly of the capacitor in FIG. 1 as indicated by the two headed arrow.

Referring now in greater detail to the drawings in which like numerals represent like components throughout the several views, FIG. 1 shows a cut-away, side view of the voltage and mechanically variable trimmer capacitor 10 in accordance with the present invention. As a short term throughout the disclosure, the voltage and mechanically variable trimmer capacitor 10 shall also be referred to as the "Voltage Trimmer" 10 and "Voltage trimmer assembly". As seen in FIGS. 1 and 2, the voltage trimmer 10 includes an alumina base 12, called "Ceramic Body" 12 which is used to house the remaining components of the voltage trimmer assembly 10.

The ceramic body 12 is essentially disc shaped with an axial hole 13 formed through its center. The top surface 14 and bottom surface 15 of the ceramic body 12 are generally flat and parallel, but a mechanism recess 16, which is concentric with the axial hole 13, is formed at the bottom surface of the ceramic body. A stamped wave washer 19 is placed on the top surface 14 of the ceramic body 12 with the center hole 20 of the wave washer aligned concentrically with the axial hole 13 of the ceramic body. The wave washer 19 is fabricated to include a leg member 21. The wave washer 19 functions as both a spring to assist in providing maximally tight fits between the faces of various adjacent components of the voltage trimmer assembly 10 as discussed below, and also as a stator connection as discussed below.

A generally disc-shaped, stator/dielectric assembly 25 is placed on top of the stamped wave washer 19. The stator/dielectric assembly 25 includes a discoid, dielectric washer 26 having a polished upper facing surface 27 and a polished lower facing surface 28. The center hole 29 of the dielectric washer 26 is aligned concentrically with the axial hole 13 of the ceramic body 12. A conductive plate 32 is formed at the lower facing surface 28 of the dielectric washer 26. Preferably, the conductive plate 32 is fired into the lower facing surface 28 of the dielectric washer 26 and is thus an integral part thereof. Also, preferably, the conductive plate is formed in a designed pattern which, in the disclosed embodiment, is a "half moon" pattern which covers only half of the dielectric, lower facing surface 28. The conductive plate 32 functions as the stator electrode as further described below.

A rotor/piezo assembly 35 is placed on top of the stator/dielectric assembly 25, contacting the upper facing surface 27 of the stator/dielectric assembly. The rotor/piezo assembly 35 of the preferred embodiment is a piezoelectric, monolithic assembly including two or more layers of piezo dielectric materials. The rotor/piezo assembly 35 of the embodiment seen in FIG. 1 is a two-layer, monolithic assembly, comprising a first layer 37 of piezo dielectric material and a second layer 38 of piezo dielectric material. The rotor/piezo assembly 35 is generally disc shaped as are each of its layers of material 37, 38. A center hole 40 is defined through the entire rotor/piezo assembly 35 being also through the centers of each of the layers of material 37, 38. The first piezo layer 37 includes a bottom surface 37a and a top surface 37b. The second layer 38 includes a bottom surface 38a and a top surface 38b. The top surface 37b of the first layer 37 and the bottom surface 38a of the second layer 38 are brought into abutment with one another and fired together to make a unitary, laminated body.

A conductive plate 42 which serves as the bimorph control electrode is embedded within the laminated body in the shape of a flat semicircular plate sandwiched between the abutting surfaces 37b, 38a of the first and second piezo layers 37, 38. The control electrode 42 includes a semicircular outer edge which tracks generally the outer periphery of the rotor/piezo assembly 35 and control electrode 42 also includes a semicircular inner edge which tracks generally the rim of the rotor/piezo assembly center hole 40. The outer edge of the control electrode 42 comes short of piercing the outer periphery of the bimorph assembly 35. As seen most clearly in FIG. 2A, the inner edge of the control electrode 42 comes just short of being exposed to the rotor/piezo assembly center hole 40. Rather, access to the control electrode 42 is had along a rectilinear, control electrode access channel 47. The access channel 47 is cut out of the second piezo layer 38, extending along the center hole 40 from the top surface 38b of the second layer 38 to the control electrode 42.

Still another conductive plate 50 is attached to the bottom surface 37a of the first piezo layer 37, that is, on the surface which makes contact with the upper facing surface 27 of the stator/dielectric assembly 25. Preferably, this conductive plate 50 is fired to the piezo material to form a unitary, laminated layer of the rotor/piezo assembly 35. This conductive plate 50 (sometimes referred to hereafter as rotor/piezo ground electrode 50) serves the double function of capacitor rotor and piezo-element ground electrode. That surface of the rotor/piezo ground electrode 50 which contacts the stator/dielectric assembly 25 is polished to a finish conforming closely with the top of the dielectric washer 26. The rotor/piezo ground electrode 50 is formed in a semicircular pattern, as seen in the figures, which conforms closely in shape and size to the stator electrode plate 32. Directly above the rotor/piezo ground electrode 50 and conforming in shape and size to the rotor/piezo ground electrode and attached to the top surface 38b of the second piezo layer 38 is another conductive plate 53 which functions as the piezo-element ground electrode 53 for the second piezo layer 38. The conductive plate 53 is preferably fired together with the piezo material so as to comprise a unitary, laminated layer of the rotor/piezo assembly 35. A peripheral conductive plate 55 is soldered, fired or otherwise connected to the outer periphery of the rotor/bimorph assembly 35. The rotor/piezo ground electrode 50 and piezo-element ground electrode 53 each extend to the outermost edge of the piezo layers 37, 38 to contact the peripheral conductive plate 55.

A hollow, tuning shaft 60 is inserted through the center holes 40, 29, 20 of the rotor/piezo assembly 35, stator/dielectric assembly 25 and stamped wave washer 19, respectively, and is further inserted through the axial hole 13 of the ceramic body 12. The shaft 60 is fitted with a head member 61 which includes flange portions 62 extending beyond the diameter of shaft 60. The shaft 60 is generally cylindrical in shape defining an axial cavity 66 through the entire length of the shaft. An axially oriented slot 67 is cut in the cylinder walls of the shaft, extending from the head end of the shaft a portion of the way down the shaft. The shaft 60 together with its head and flange portions 61, 62 is formed of electrically conductive material. On the end of the shaft 60 opposite the head 61, the shaft is formed with slotted walls 63 to permit radially outward deflection of the bottom ends of the shaft (the slotted walls) after assembly. The head 61 is formed with a screwdriver slot 64 along its top side. In the assembled state at least a portion of the bottom surfaces 65 of the flange portions 62 make contact with the piezo-element ground electrode 53. Once the shaft has been inserted into the assembly, such that it protrudes through the axial hole 13 of the ceramic body 12, a rotor connection washer 68 is slipped over the slotted wall end 63 of the shaft 60 and the washer is moved up into the mechanism recess 16 of the ceramic body. Once the rotor connection washer 68 is in place within the mechanism recess 16, the slotted walls 63 of the shaft are turned radially outward and rolled over pinching the washer against the mechanism recess and clamping the shaft head 61, rotor/piezo assembly 35, stator/dielectric assembly 25, stamped wave washer 19 and ceramic body 12 into a sandwich like assembly. The rotor connection washer 68 is formed with a leg member 69 which is left protruding from the mechanism recess 16. The washer 68 together with its leg member 69 is formed of electrically conductive material. Thus an electrical contact is made from the piezo-element ground electrode 53 to the bottom surfaces 65 of the shaft head 61, to the cyndrical body of the shaft 60, to the rolled over slotted walls 63, to the rotor connection washer 68 and finally to the leg member 69. The leg member 69, therefore, serves as the electrical connection point for both the rotor 50 of the capacitor and the multiple, ground electrodes 50, 53 of the piezo layers 37, 38.

A sleeve member 72 is force fit into the axial cavity 66 of the hollow tuning shaft 60. The sleeve member 72 which has an outside diameter only slightly less than the inside diameter of the tuning shaft 60 is forced into the shaft cavity from the bottom end 63 (opposite the head 61) of the shaft. The sleeve member 72 is formed with a radial flange 73 at its bottom end, and axial cavity 74 through its center and an axial slot 75 extending partly down the sleeve from its top end (See FIG. 2). A cylindrical shaped, control electrode contact 78, in the shape of a hollow rivet, is pressed through the head 61 of the tuning shaft 60, along the axial cavity 66 of the shaft and into the axial cavity 74 of the sleeve member 72. the sleeve member 72 serves to insulate the conductive tuning shaft 60 from the conductive control electrode contact 78. In the preferred embodiment, the sleeve member 72 is made of a chemically resistant, heat-stable, insulating material such as that sold under the trademark "TEFLON" by Dupont. The control electrode contact 78 is formed at its bottom end with slotted walls 79 to permit radially outward deflection as with the slotted walls 63 of the tuning shaft 60. The electrode contact 78 is also formed with a radially extending tab 80 which, during assembly, passes along the axial slot 67 of the tuning shaft 60 and also along the axial slot 75 of the sleeve member 72, which are each in alignment with the control electrode access channel 47 until the tab firmly seats on the exposed piezo-element control electrode 42. An electrode connection washer 85 is placed over the bottom end 79 of the control electrode contact 78 and brought into contact with the radial flange 73 of sleeve member 72. Once the washer 85 is in place, the slotted walls 79 of the control electrode contact 78 are bent radially outward and rolled over to pinch the washer snugly against the sleeve flange 73. The control electrode washer 85 is formed with a leg member 86 which extends from the ceramic body 12 and functions as the electrode connection for the control electrode 42 of the piezo element.

Once all of the components described above are assembled as mentioned above, the last assembly procedure is to simply spot solder the head 61 of the tuning shaft 60 to the piezo-element ground electrode 53 and to spot solder the control electrode contact tab 80 to the control electrode 42. The tuning shaft 60, the rotor/piezo assembly 35, the sleeve member 72 and control electrode contact 78 are now a single piece. The finally assembled Voltage trimmer 10 of the preferred embodiment is seen in its top and side views in FIGS. 3 and 4, respectively. As the tuning shaft 60 is rotated about the shaft access, for example, by turning the shaft with a screwdriver inserted in the screwdriver slot 64, the entire single-piece, rotor/piezo assembly 35 rotates relative to the stator/dielectric assembly 25 and the ceramic base 12. As the rotor assembly 35 rotates, the rolled over ends 63 of the shaft 60 slide in a rotational fashion along the rotor connection washer 68. Likewise, the rolled over ends 79 of the control electrode contact 78 slide in a rotational fashion along the control electrode connection washer 85. In this way, fixed geometry is permitted on all connections.

Although in the present invention, the same material could be used in the separate layers 37, 38, but with different poling, in the preferred embodiment, the layers 37, 38 of the rotor/piezo assembly 35 are of different piezo dielectric materials. Some examples of materials which may be used as either of the layers 37, 38 are the piezoelectric materials shown in Table I below, for which the units and description of symbols are defined in Table II below. The materials of Table I include barium titanate and four variations of lead zirconate-lead titanate (PZT) ceramics. The ceramics are polycrystalline in nature and do not have piezoelectric properties in their original state. Piezoelectric behavior is induced in these materials by a polarizing treatment (poling). The piezoelectric materials used by the present invention are not to be limited by those expressed in Table I.

TABLE I

Piezoelectric Ceramics - Typical Room Temperature Data (Low Signal)

|  |  | Ceramic B | PZT-4 | PZT-5A | PZT-5H | PZT-8 |
|---|---|---|---|---|---|---|
| At one kcps* | $\epsilon_{33}^T/\epsilon_O$ | 1200 | 1300 | 1700 | 3400 | 1000 |
| | $\epsilon_{33}^S/\epsilon_O$ | 910 | 635 | 830 | 1470 | 600 |
| | $\epsilon_{11}^T/\epsilon_O$ | 1300 | 1475 | 1730 | 3130 | 1290 |
| | $\epsilon_{11}^S/\epsilon_O$ | 1000 | 730 | 916 | 1700 | 900 |
| | tan δ | 0.006 | 0.004 | 0.02 | 0.02 | 0.000 |
| | $k_p$ | −.33 | −.58 | −.60 | −.65 | −.51 |
| | $k_{31}$ | −.194 | −.334 | −.334 | −.388 | .39 |
| | $k_{33}$ | .48 | .70 | .705 | .752 | .64 |
| | $k_{15}$ | .48 | .71 | .685 | .675 | .55 |
| | $k_t$ | .384 | .513 | .486 | .505 | .48 |
| | $k_{13}$ | .491 | .715 | .715 | .754 | .63 |
| | $d_{31}$ | −58 | −123 | −171 | −274 | −.97 |
| | $d_{33}$ | 149 | 289 | 374 | 593 | 225 |
| | $d_{15}$ | 242 | 496 | 584 | 741 | 330 |
| | $d_h$ | 33 | 43 | 32 | 45 | .31 |
| | $g_{31}$ | −5.5 | −11.1 | −11.4 | −9.11 | −10.9 |
| | $g_{33}$ | 14.1 | 26.1 | 24.8 | 19.7 | 25.4 |
| | $g_{15}$ | 21.0 | 39.4 | 38.2 | 26.8 | 28.9 |
| | $s_{11}^E$ | 8.6 | 12.3 | 16.4 | 16.5 | 11.5 |
| | $s_{33}^E$ | 9.1 | 15.5 | 18.8 | 20.7 | 13.5 |
| | $s_{44}^E$ | 22.2 | 39.0 | 47.5 | 43.5 | 31.9 |
| | $s_{12}^E$ | −2.6 | −4.05 | −5.74 | −4.78 | −3.7 |
| | $s_{13}^E$ | −2.7 | −5.31 | −7.22 | −8.45 | −4.8 |
| | $s_{11}^D$ | 8.3 | 10.9 | 14.4 | 14.05 | 10.1 |
| | $s_{33}^D$ | 7.0 | 7.90 | 9.46 | 8.99 | 8.5 |
| | $s_{44}^D$ | 17.1 | 19.3 | 25.2 | 23.7 | 22.6 |
| | $s_{12}^D$ | −2.9 | −5.42 | −7.71 | −7.27 | −4.5 |
| | $s_{13}^D$ | −1.9 | −2.10 | −2.98 | −3.05 | −2.5 |
| | $Q_M$ | 400 | 500 | 75 | 65 | 1000 |
| | $N_1$ | 2290 | 1650 | 1400 | 1420 | 1700 |
| | $N_{3t}$ | 2740 | 2000 | 1890 | 2000 | 2070 |
| | $N_{3a}$ | 2530 | 2060 | 1845 | 1930 | 2000 |
| | ρ | 5.55 | 7.5 | 7.75 | 7.5 | 7.6 |
| | Curie Point | 115° C. | 328° C. | 365° C. | 193° C. | 300° C. |

*For PZT-5A the dielectric constants decrease about 2.4%/decade of frequency to at least 20 mcps and increase 2.4%/decade of frequency below 1 kcps to at least 1 cps.
*For PZT-4 the dielectric constants decrease about 1.0%/decade of frequency to at least 1 mcps and increases 1.0%/decade of frequency below 1 kcps to at least 1 cps.

TABLE II
Units and Description of Symbols $\epsilon_o$ = dielectric constant of free space = $8.85 \times 10^{-12}$ farads/meter.
$\epsilon^T/\epsilon_o$ = relative dielectric constant, free.
$\epsilon^S/\epsilon_o$ = relative dielectric constant, clamped.

$\tan \delta = \dfrac{1}{Q_E}$ = dissipation factor at 1 kcps, low electric field.

$k_p$ = planar coupling factor.
$k_{31}$ = transverse or lateral coupling factor.
$k_{33}$ = longitudinal coupling factor.
$k_{15}$ = shear coupling factor.
$k_t$ = thickness coupling factor (laterally clamped).
d = piezoelectric constant, strain/field at constant stress or charge density/stress at constant electric field, $10^{-12}$ meters/volt.
g = piezoelectric constant, electric field/stress at constant charge or strain/charge density at constant stress, $10^{-3}$ volt meters/newton.
$s^E$ = elastic compliance at constant electric field, $10^{-12}$ meter²/newton.
$s^D$ = elastic compliance at constant charge density, $10^{-12}$ meter²/newton.
$Q_M$ = mechanical Q. This is dependent upon configuration, and is given here for a thin disc.
$N_1$ = frequency constant of a thin bar, $f_{R.l}$, cycle meters/second.
$N_{3a}$ = frequency constant of a long slender bar electroded on ends, $f_{a.l}$, cycle meters/second
$N_{3t}$ = frequency constant of a thin plate, $f_{r.t}$, cycle meters/second₅
$v_3^D$ = velocity of a compressional wave parallel to polar axis $\{c_{33}^D = (v_3D)^2 \rho\}$, meters/second.
$v_4^D$ = velocity of a shear wave perpendicular to polar axis with wave polarization parallel to polar axis $\{c_{44}^D = (v_4^D)^2 \rho\}$, meters/second.
$v_4^E$ = velocity of a shear wave parallel to polar axis, $\{c_{44}^E = (v_4^E)^2 \rho\}$, meters/second.
$\rho$ = density, $10^3$ kg/m³.
$\Phi$ = temperature, °C.
P = polarization, $10^{-6}$ coulomb/cm²($10^{-2}$ coulomb/m²).
$\alpha$ = thermal expansion, $10^{-6}$/°C.

It is the intention of the inventor, and the goal of the user, in accordance with the present invention, to chose different materials for the various layers of the monolithic piezo assembly 35, which differing materials compensate for and offset individual trends of any one material. Such trends, include, but are not limited to, unwanted temperature coefficients and "creep" tendencies. Furthermore, it is an intention of the inventor in accordance with the present invention, to provide a monolithic rotor 35 of a piezo structure including two, or more than two, layers of piezo material which layers can be made almost arbitrarily thin thus controlling the field intensity of the piezo assembly and providing greater long term stability of the piezo elements.

Preferred materials for the real dilectric 26 include, but are not limited to alumina, sapphire, titanate ceramics and glass. Since the piezo materials 37, 38 are not part of the RF circuit, loss characteristics are not relevant to the total capacitance of the voltage trimmer 10. The major relevant losses, it is submitted, are those associated with the structure and capacitor dielectric 26. For UHF applications, for example, the selected dielectric might be alumina or even sapphire with extremely low associated losses.

Figure 5:
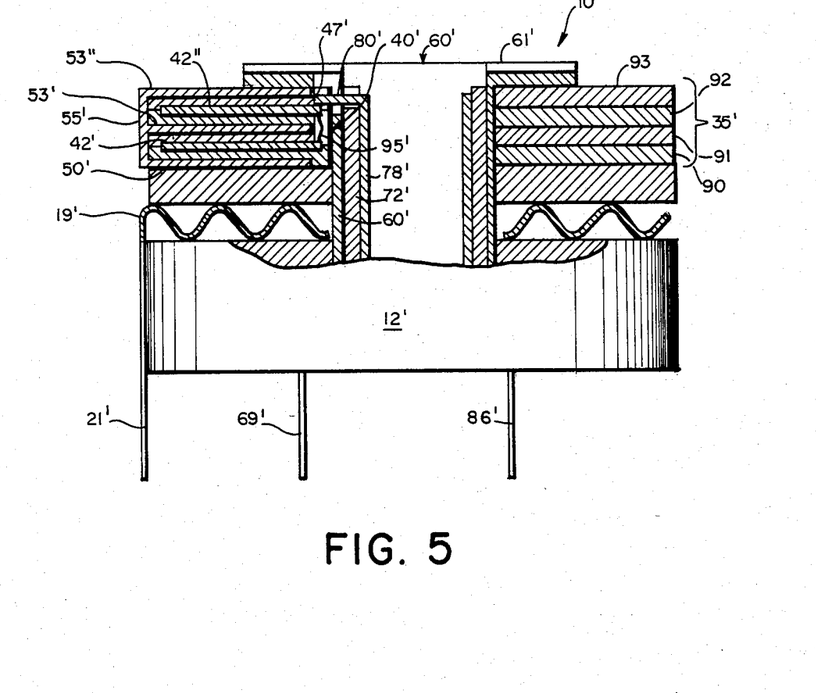
FIG. 5 is a cut-away, side-view of the voltage and mechanically variable trimmer capacitor in accordance with the present invention, but showing an alternate embodiment to that of FIG. 1.

In the alternate embodiment seen in FIG. 5, the rotor/piezo assembly 35' is seen as being a monolithic assembly including four (4) piezo layers 90,91,92,93. The Voltage Trimmer 10' seen in FIG. 5 is basically similar in construction to that of FIG. 1 but including modifications to accomodate electrically connecting the bimorph elements of the four layer piezo assembly 35'. Each layer 90-93 is provided with both a ground electrode 50', 53', 53" and a control electrode 42', 42", alternating as seen in the FIG. 5. The lower most electrode 50' is again the rotor/piezo ground electrode 50' which serves as both the rotor electrode of the capacitor and as the ground electrode for the lower piezo element 90. The upper most plate 53" is again a piezo element ground electrode 53" which is in soldered contact with the head 61' of the tuning shaft 60'. The three ground electrodes 50', 53', 53" extend to the outer periphery of the piezo disc where they are each connected to the peripheral conductive plate 55'. The two piezo control electrodes 42', 42" do not extend to the outer periphery of the disc, but rather extend close to, but does not reach, the inner periphery at the center hole 40'. A portion of each of the control electrodes, 42', 42" is exposed at the narrow control electrode access channel 47' which extends through the top three piezo layers 93,92,91. The control electrodes 42', 42" are connected together by, for example, a shunt wire 95 within the access channel 47'. In this way, the contact made by the control electrode contact tab 80' on the upper control electrode 42" is continued through to the lower control electrode 42'.

Figure 6:
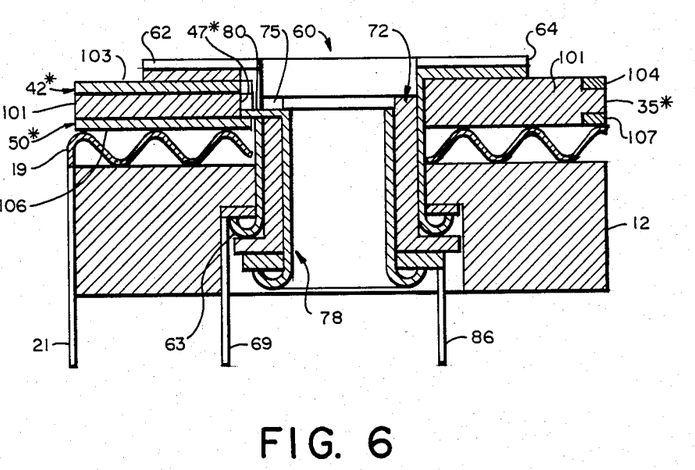
FIG. 6 is a cross-sectional side view of the voltage and mechanically variable trimmer capacitor in accordance with the present invention, but showing a second alternate embodiment to that of FIG. 1.
Figure 6A:
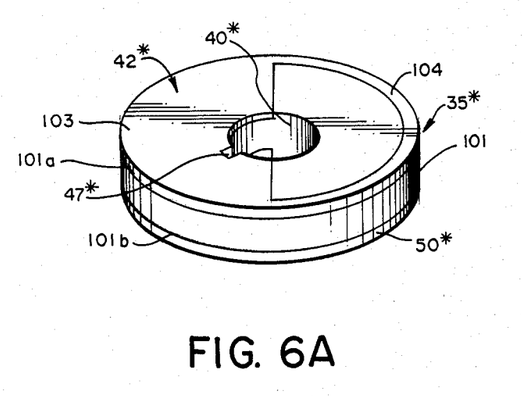
FIG. 6A is an isolated perspective view of the rotor/piezo assembly of the embodiment of FIG. 6.

Still another alternative embodiment of the present invention comprises a rotor/piezo assembly 35* of the single piezo layer configuration as seen in FIGS. 6 and 6A. The rotor/piezo assembly 35* of the embodiment of FIG. 6 includes a single layer 101 of piezoelectric material. A conductive, piezo control electrode 42* is attached to the piezo layer 101 at the upper surface 101a of the piezo material. The control electrode 42* comprises a main, flat, semicircular plate portion 103 of a configuration seen in FIG. 6A, which main portion 103 overlays approximately half of the piezo layer 101. The control electrode 42* further comprises a thin perimeter strip 104 of plate material which rims the outer periphery of the piezo layer 101. A conductive, rotor/piezo ground electrode 50* is attached to the piezo layer 101 at the lower surface 101b of the piezo material. The ground electrode 50* is of the same general shape as the control electrode 42*, comprising a main, semicircular plate portion 106 and a thin perimeter strip 107. The ground electrode 50* of FIG. 6 comes short of reaching the periphery of the rotor/piezo center hole 40*. An access channel 47* extends axially along the center hole 40* through the control electrode 42* and the piezo material 101 to the gound electrode 50*.

The remaining configuration of the embodiment of FIG. 6 is similar to that of the embodiments of FIGS. 1–4. However, it will be noted that the radially extending tab 80 of the electrode contact 78, in the embodiment of FIG. 6, makes contact through the access channel 47* with the rotor/piezo ground electrode 50*. Therefore, the electrode contact 78 is the ground electrode contact and leg member 86 functions as the electrode connection for the ground electrode of the piezo element and the ground electrode of the rotor/stator capacitor combination. Likewise, the shaft flange portion 62, in the embodiment of FIG. 6, contacts the control electrode 42*. Therefore, the tuning shaft 60 is the control electrode contact and leg member 69 serves as the electrical connection for the control electrode of the piezo element. It is noted that these arrangements are opposite those of the embodiment of FIGS. 1–5.

Figures 3, 4:
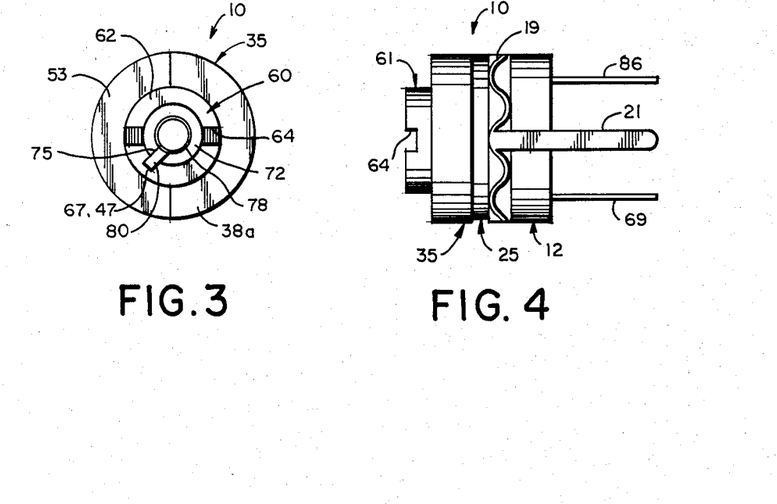
FIG. 3 is a top view of the capacitor of the voltage and mechanically variable trimmer capacitor in accordance with the present invention.
FIG. 4 is a side view of the capacitor of FIG. 3.
Figure 10:
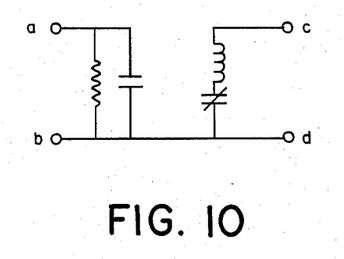
FIG. 10 is a circuit diagram showing a circuit equivalent to the voltage and mechanically variable trimmer capacitor in accordance with the present invention.

Operation. As seen in FIG. 4 the stator connection leg member 21, the rotor connection leg member 69 and the piezo control electrode connection leg member 86 protrude from the ceramic body 12 in the manner of prongs or plugs. The voltage trimmer 10 finds practical application in, for example, an oscillator circuit which includes an inductor and capacitor tuning circuit (LC circuit). Typically, a mechanically adjustable, setting capacitor is put in parallel across the circuit capacitor, to tune the setting capacitor until the resonant frequency of the oscillator is where the user desires. The Voltage trimmer 10 of the present invention replaces the parallel combination of circuit capacitor and setting capacitor. The two active terminals (electrodes) of the voltage trimmer 10, being stator electrode 32 and rotor/piezo ground electrode 53, are connected in series with the inductor of the oscillator tuning circuit; the series combination now functioning as the LC tuning circuit. The piezo control electrode 42 is connected to a remote voltage source such as a remote control circuit or a feedback circuit. A schematic equivalent circuit of the invented voltage trimmer 10 is seen in FIG. 10. The control impedance is introduced across terminals "a" and "b", terminal "a" being the control electrode (piezo control electrode 42) and terminal "b" being the common (i.e. rotor/piezo ground electrode 50/53). The variable capacitance is realized across terminals "c" and "d", terminal "c" being the first capacitor electrode (stator electrode 32) and terminal "d" being the second, capacitor electrode (rotor/piezo ground electrode).

With the invented voltage trimmer 10 installed within the oscillator circuit, the user places a screwdriver in the screwdriver slot 64 and turns the rotor/piezo assembly 35 relative to the stator/dielectric assembly 25. This movement rotates the half moon, rotor/piezo ground electrode 50 relative to the half moon, stator electrode 32 from progressively a position of high capacity (see curve "e" of FIG. 11) where the overlapping areas of conductive plates 50, 32 of the two electrodes are greatest (i.e. the rotor electrode 50 directly and completely above the stator electrode 32), to a position of low capacity (see curve "h" of FIG. 11) where the two conductive plates have little or no overlapping areas (i.e. no portion of the rotor electrode overlaps the stator electrode). This rotation of the rotor/piezo assembly 35 and attendant relative positioning of the rotor and stator electrodes 50, 32 mechanically tunes the voltage trimmer 10 to selectively increase or decrease the capacity for any particular control voltage setting.

The operation of the piezo layers 37, 38 (90, 91, 92, 93) is based on piezoelectric characteristics known in the art. Piezo electric materials expand in the direction of "poling"; that is, when they experience an electric field oriented in a similar direction as the original poling field. Contrarywise, the piezo electric material contracts when exposed to a reversed field. In this manner, the diameter of each piezo layer 37, 38 (90–93) can be made to increase or decrease by applying a suitable field.

Figure 7:
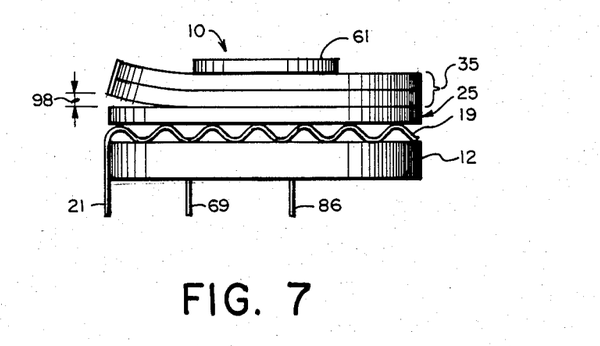
FIG. 7 is a cut-away side view of the capacitor of FIG. 1 showing the rotor/piezo assembly in a dished state.

In the two layer piezo, monolithic embodiment of FIGS. 1 and 7, because the control electrode 42 is common to both piezo layers 37, 38 and the ground electrodes 50, 53 for both layers are connected, application of a voltage to the terminals 69, 86 causes one layer to increase its diameter while the other decreases. Since the two halves are mechanically joined and oppositely poled, the assembly 35 solves this dilemma by becoming "dish" shaped as seen in FIG. 7. The conductive electrode patterns for both the stator 32 and rotor 50 are approximately semicircular, as described above, so that the electrode area dishes but the clear area remains discoidal. This dishing effect of the voltage trimmer's capacitor rotor, in accordance with the present invention, introduces an air gap 98 into the rotor electrode (50)-dielectric (26) configuration thus reducing the achieved capacity of the voltage trimmer 10, at a given mechanically tuned setting.

Figure 8:
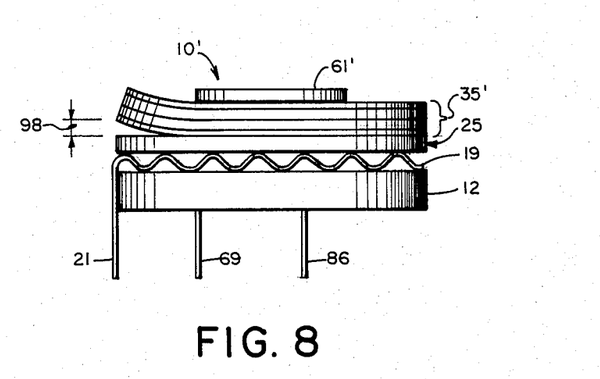
FIG. 8 is a cut away, side view of the capacitor of FIG. 5 showing the rotor/piezo assembly in a dished state.

The four layer piezo monolithic embodiment, as shown in FIGS. 5 and 8 and all other monolithic embodiments in accordance with the present invention function in substantially the same manner. That is, the ground electrodes 50', 53', 53'' and the control electrodes 42', 42'' are alternated within the layers 90–93 so as to oppositely pole alternate layers and, thus, create the mentioned dishing effect and the resultant air gap 98.

Figure 9:
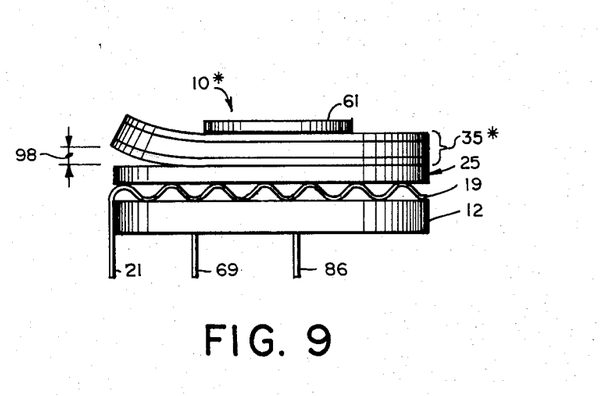
FIG. 9 is a cut-away side view of the capacitor of FIG. 6 showing the rotor/piezo assembly in a dished state.

In the single layer piezo embodiment of FIGS. 6 and 9, a voltage applied to the terminals 69, 86 causes the layer to increase or decrease its diameter, depending on the direction of the applied field. Since the piezo layer 101 is joined firmly with the rigid plates of the control electrode 42* and the ground electrode 50*, the piezo material can not freely expand or contract along its diameter. Therefore, the assembly 35* solves this dilemma by becoming "dish" shaped, in a manner similar to that seen in FIG. 9, and creates the resultant air gap 98 between the dielectric washer 26 and the rotor/piezo ground electrode plate 50*. The perimeter strips 104, 107 assist in stabilizing the piezo element.

Figure 1A:
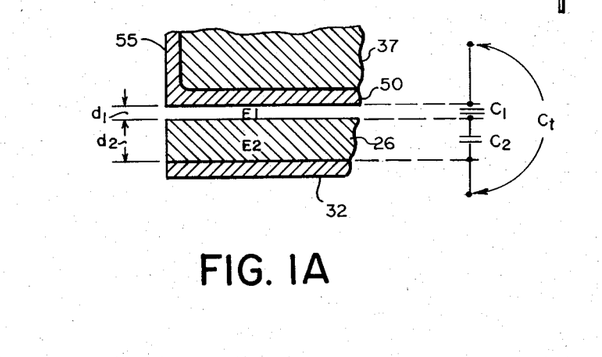
FIG. 1A is an isolated, cut-away, side view of a portion of the cross-section of FIG. 1.

FIG. 1A shows a cutaway portion of the cross-section of FIG. 1. It may be appreciated that the geometry of the preferred embodiment shown in FIG. 1 leads to the equivalent circuit (at least for the capacitive elements) which results from the geometry of the preferred embodiment. In FIG. 1A, the distance $d_1$ is somewhat exaggerated and shown as an air gap between plate 50 and dielectric material 26. The notation $\epsilon_1$ indicates this air gap has a dielectric constant of $\epsilon_1$ which will be approximately equal to one. This air gap $d_1$ is the same as the air gap 98.

The top of dielectric material 26 forms a virtual plate which may be thought of as the lower plate of capacitor $C_1$ and the upper plate of capacitor $C_2$ shown in FIG. 1A. Capacitor $C_2$ results from the geometry of the aforementioned virtual plate and plate 32 separated by dielectric material 26. Dielectric material 26 has a characteristic dielectric constant $\epsilon_2$ as indicated on FIG. 1A.

From inspection of FIG. 1A, it will be appreciated that the total capacitance between the terminals shown as $C_t$ on FIG. 1A is given by the following expression:

$$C_+ = \frac{C_1 C_2}{C_1 + C_2}$$

Since each capacitor $C_n$, n=1 or 2, has a value given by the following expression:

$$C_1 = k' \frac{\epsilon_1 A}{d_1}$$

$$C_2 = k' \frac{\epsilon_2 A}{d_2}$$

(for Air, $\epsilon_1 = 1$)

where A is the area of the respective plates, it will be readily appreciated that the total equivalent capacitance is given by the following expression:

$$C_+ = \frac{k' \epsilon_2 A}{\epsilon_2 d_1 + d_2}$$

(since $\epsilon_1 = 1$)

where k' is a constant and A is the area of the capacitor plates. It will be appreciated that A varies according to the mechanical rotation of the trimmer. Inspection of the denominator of the foregoing expression will indicate that distance $d_1$ is very small when no voltage is applied to the piezo assembly and increases by several orders of magnitude when the piezo assembly is flexed. This coupled with the fact that $\epsilon_2$ is orders of magnitude greater than $\epsilon_1$, the dielectric constant of air. Thus, it will be appreciated that the denominator will be dominated by its $d_2$ term when no voltage is applied and that embodiments may be designed wherein the $d_1$ term dominates the denominator under conditions of applied voltage.

From the forgoing it will be appreciated that selection of dielectric material 26, and its thickness, can lead to a wide tuning range for any given geometry defined by the mechanical rotation of the plates.

Figure 11:
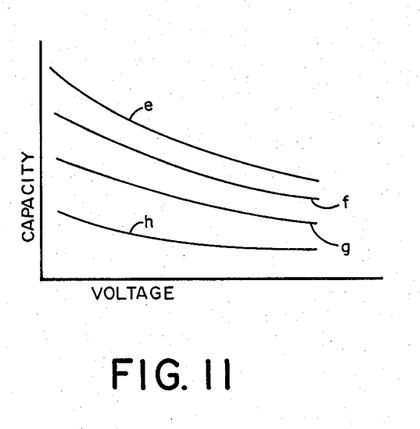
FIG. 11 is a voltage-capacity curve showing an example of a curve achievable by the voltage and mechanically variable trimmer capacitor of the present invention.

FIG. 11 shows an example of an achievable voltage-capacity curve for a Voltage and mechanically variable trimmer capacitor (voltage trimmer) 10 made and operating in accordance with the present invention. Capacitance of the voltage trimmer 10 recorded across stator terminal (leg) 21 and rotor terminal (leg) 69 (or 86 of FIG. 6) is noted along the vertical axis and voltage across the piezo electrodes 42 and 50/53 is noted along the horizontal axis. Curve "e" represents the achievable voltage-capacity curve for the maximum mechanically tuned position of the invented voltage trimmer 10. Curve "h" represents the achievable voltage-capacity curve for the minimum mechanically tuned position of the voltage trimmer 10. Curves "f" and "g" represent random samplings of intermediate mechanically tuned positions of the voltage trimmer 10. The curves indicate that as the voltage across the piezo electrodes 42, 50/53 increases, the capacitance of the voltage trimmer 10 decreases for a given mechanically tuned setting.

Whereas, the preferred embodiments of the voltage trimmer 10 described and shown herein, disclose a system mechanically pinioned in the geometric center by a shaft 60 which also serves as the screwdriver adjustment, it is within the scope of this invention that the components of this voltage trimmer 10 be contained by a rim clasp design. In such an embodiment, the dishing characteristic of the monolithic rotor/piezo assembly 35 would raise the rotor center, thus producing the air gap 98 in the middle of the disc, leaving the rotor rim in place abutting the stator/dielectric assembly 25.

Similarly, other configurations are feasible, for example, it is within the scope of the invention to make the stator into the monolithic piezo assembly which dishes under control voltage, and to design the rotor-dielectric interface as the rotating but non-bending components of the voltage trimmer 10.

Whereas, this invention has been described in detail with particular reference to preferred embodiments thereof, it will be understood that variations and modifications can be effected within the spirit and scope of the invention as described hereinbefore and as defined in the appended claims.

I claim:

1. A capacitor which is both voltage and mechanically variable, said capacitor comprising:
   a first electrode defining a first plane;
   a second electrode defining a second plane arranged generally parallel to said first plane;
   said first electrode and said second electrode being movable relative to one another by mechanical means from a high capacity position wherein said first electrode and said second electrode completely overlaps progressively through intermediate positions to a low capacity position wherein said first electrode and said second electrode have minimal overlapping;
   mechanical adjustment means for accepting mechanical stimulus for moving said first electrode and second electrode relative to one another;
   a dielectric between said first electrode and said second electrode;
   voltage variable piezoelectric means associated with said first electrode for bending said first electrode in response to a voltage applied to said piezoelectric means to deflect said first electrode out of said first plane; and
   voltage accepting means for accepting voltage applied to said piezoelectric means,
   whereby mechanical adjustment of the relative positions of said first electrode and said second electrode varies the capacity of the capacitor and application of a voltage to the piezoelectric means further varies the capacity of the capacitor.

2. Capacitor of claim 1, wherein said first electrode comprises a rotor element of the capacitor and said second electrode comprises a stator element of the capacitor.

3. Capacitor of claim 1, wherein said first electrode comprises a stator element of the capacitor and said second electrode comprises a rotor element of the capacitor.

4. Capacitor of claim 1, wherein said piezoelectric means comprises at least one layer of piezoelectric material selected from the group consisting of ceramic-B, PZT-4, PZT-5A, PZT-5H and PZT-8.

5. A capacitor which is both voltage and mechanically variable, said capacitor comprising:
- a monolithic rotor assembly including at least two layers of piezoelectric material and conductive elements associated with each of said layers for delivering a voltage across each said layer in alternate polarities, whereby adjacent ones of said layers are poled oppositely upon application of a voltage, one of said conductive elements defining at least a portion of a flat surface of said rotor assembly;
- a dielectric element adjacent said flat surface of said rotor;
- a stator electrode plate adjacent said dielectric element and opposite said rotor assembly;
- said rotor being movable by mechanical means progressively into and out of complete overlapping alignment with said stator electrode plate,
- whereby mechanical adjustment of the rotor assembly relative to the stator electrode plate varies the capacity of the capacitor and application of a voltage to the piezo layers of the rotor assembly further varies the capacity of the capacitor.

6. Capacitor of claim 5, wherein alternate conductive elements of said rotor assembly are connected one to a first voltage source within a first circuit and the other to an electrical ground, said conductive element which defines a portion of said flat surface of said rotor assembly being one of said elements connected to an electrical ground, and wherein said stator electrode plate is connected to a second circuit.

7. Capacitor of claim 5, wherein alternate conductive elements are connected one to a first voltage source and the other to an electrical ground, said conductive element which defines a portion of said flat surface of said rotor assembly being one of said elements connected to an electrical ground, and wherein said stator electrode plate is connected to the same said first voltage source.

8. Capacitor of claim 5, wherein said monolithic rotor assembly comprises four or more layers of piezo dielectric materials and at least two of said layers comprise dissimilar piezo dielectric material.

9. In a mechanically tunable capacitor including a first electrode, a second electrode and a dielectric therebetween, a piezo electric means associated with said first electrode for changing the dimensions of the interface between said first electrode and said dielectric in response to an electrical stimulus.

10. In the capacitor of claim 9, said piezo electric means comprising a control electrode electrically shielded from the circuit to be tuned by the capacitor.

11. In the capacitor of claim 9, said piezo electric means comprising an electronic tuning control terminal separated from the circuit to be tuned by the capacitor.

12. In the capacitor of claim 9, said piezo electric means comprising at least one layer of piezoelectric material selected from the group consisting of Ceramics-B, PZT-4, PZT-5A. PZT-5H and PZT-8.

* * * * *